United States Patent [19]

Maloof

[11] 4,428,716
[45] Jan. 31, 1984

[54] VARIABLE PITCH PROPELLER HUB WITH FLUID MOTOR ACTUATING MEANS

[76] Inventor: Ralph P. Maloof, 4527 Park Monaco, Calabasa, Calif. 91302

[21] Appl. No.: 144,390

[22] Filed: Apr. 28, 1980

Related U.S. Application Data

[63] Continuation of Ser. No. 805,283, Jun. 10, 1977, Pat. No. 4,202,655.

[51] Int. Cl.³ .............................................. F04D 29/36
[52] U.S. Cl. .............................. 416/157 R; 416/168 R; 416/154
[58] Field of Search ................... 416/157 R, 154, 168, 416/136

[56] References Cited

U.S. PATENT DOCUMENTS

| | | | |
|---|---|---|---|
| 1,802,808 | 4/1931 | De Narde | 416/157 |
| 2,360,571 | 10/1944 | Meehan | 416/168 |
| 2,390,068 | 12/1945 | Adams et al. | 416/168 X |
| 2,392,341 | 1/1946 | Squier | 416/157 X |
| 2,425,261 | 8/1947 | Murphy et al. | 416/157 |
| 2,492,653 | 12/1949 | Reek | 416/136 X |
| 2,992,688 | 7/1961 | Biermann | 416/157 |
| 3,115,937 | 12/1963 | Biermann | 416/154 X |
| 3,167,131 | 1/1965 | Voisard | 416/154 |
| 3,249,161 | 5/1966 | Schoenherr | 416/136 R |
| 3,393,748 | 7/1968 | Barnes | 416/157 |
| 3,792,937 | 2/1974 | Chilman | 416/157 |
| 4,037,986 | 7/1977 | Chilman | 416/154 X |
| 4,202,655 | 5/1980 | Maloof | 416/168 X |

FOREIGN PATENT DOCUMENTS

| | | | |
|---|---|---|---|
| 727968 | 11/1942 | Fed. Rep. of Germany | 416/136 |
| 1095454 | 12/1960 | Fed. Rep. of Germany | 416/157 C |
| 1096293 | 6/1955 | France | 416/157 R |
| 595427 | 12/1947 | United Kingdom | 416/157 R |

*Primary Examiner*—Everette A. Powell, Jr.
*Attorney, Agent, or Firm*—William H. Maxwell

[57] ABSTRACT

A variable pitch propeller hub with fluid motor actuating means wherein blading is controllably pitched and feathered by a hub having cylinder and piston means responsive to engine oil pressure and rotating the blades on their radial axes to a full pitch position by link and lever means biased toward a feathered position by an adjustor means having adjustable stops and means for maintaining moderate pitch until the engine is stopped.

13 Claims, 12 Drawing Figures

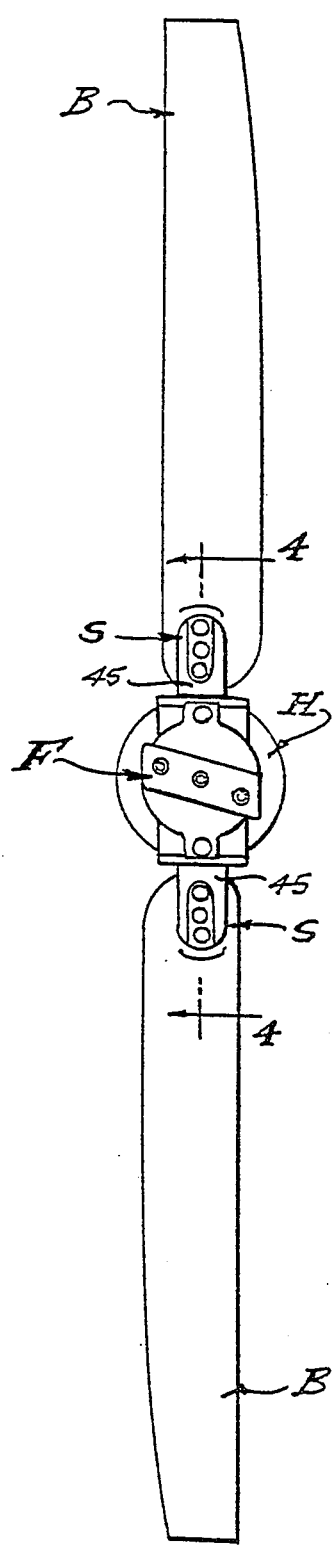
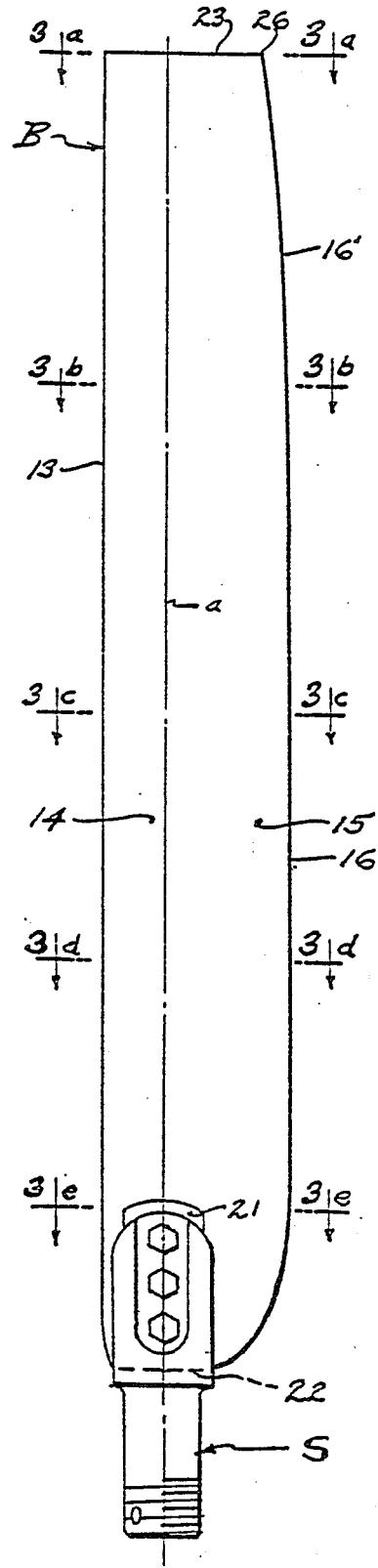
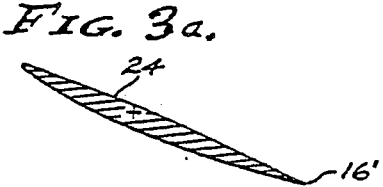
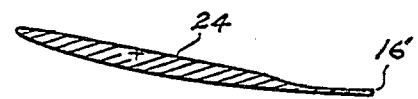
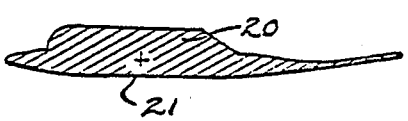

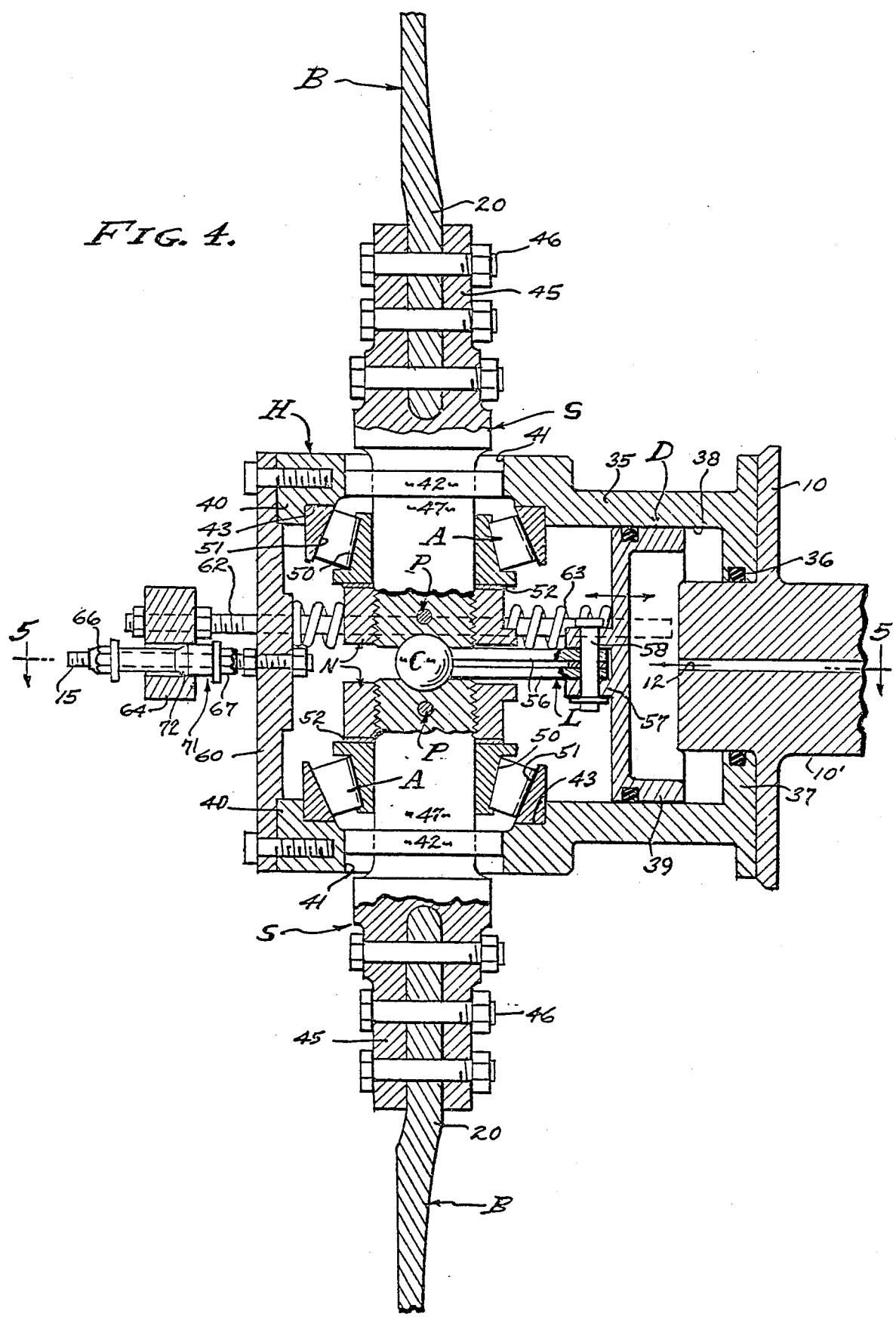

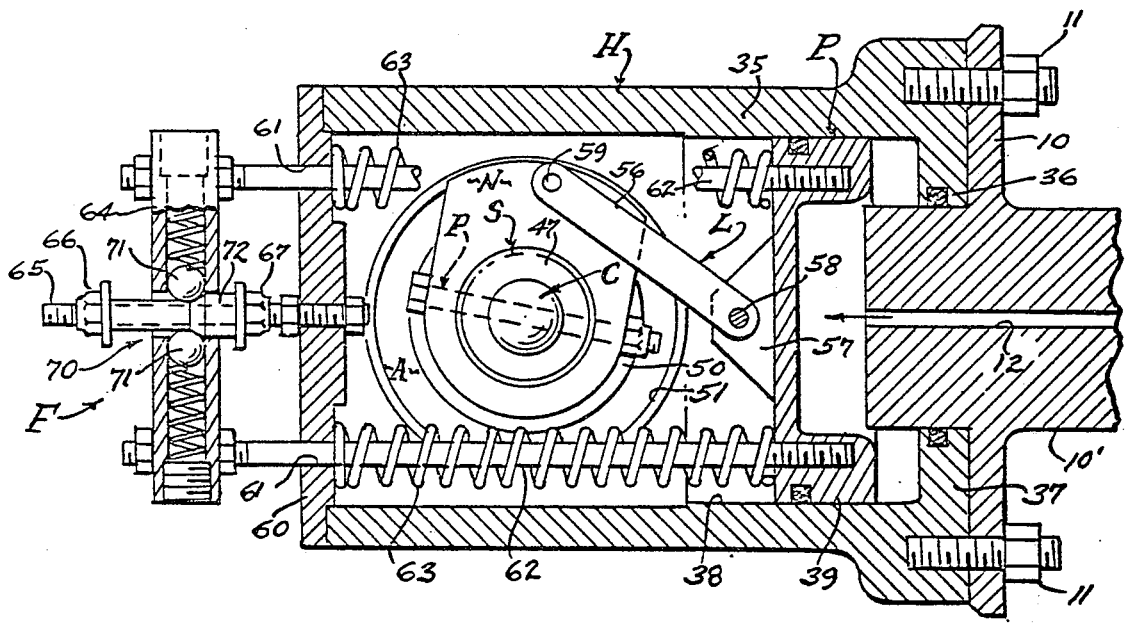
FIG. 5.
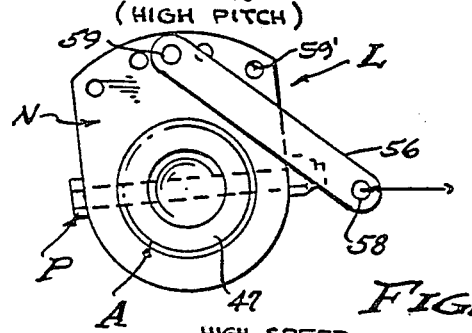
FIG. 5a. (HIGH PITCH)
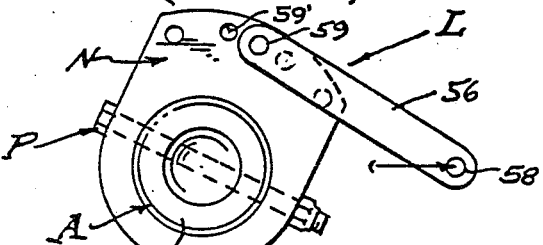
FIG. 5b. (LOW PITCH)
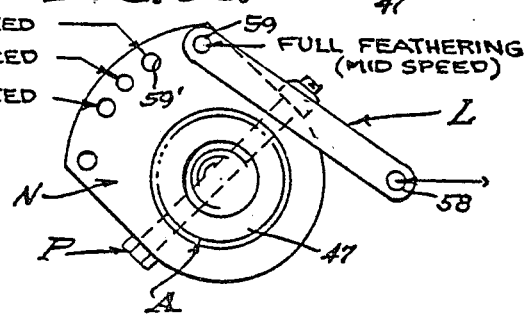
FIG. 5c.

VARIABLE PITCH PROPELLER HUB WITH FLUID MOTOR ACTUATING MEANS

REFERENCE TO EARLIER APPLICATION

This application is continuation of application Ser. No. 805,283, filed June 10, 1977 and entitled PROPELLER FOR BLADING AND HUB THEREFOR and issued May 13, 1980 as U.S. Pat. No. 4,202,655; and is copending with application Ser. No. 144,389 filed Apr. 28, 1980 on even date herewith and entitled METHOD OF MAKING A PROPELLER BLADE.

The controllability of blade pitch in propellers is recognized as a necessity with certain types of aircraft. For example, blade pitch is to vary with engine RPM and is to feather when the engine is stopped; conditions especially adapted to powered sail planes and the like. To this end it is a general object of this invention to provide a propeller hub responsive to engine oil pressure so as to apply blade pitch and to flatten the same with increased engine RPM, and to hold a moderate pitch until engine operation ceases and at which time the blades are feathered. However, it is to be understood that this propeller hub is also adapted to controlled pitch through the application of adjusted fluid pressure. The blade control mechanism is piston operated through selectively adjustable link and lever connections to each blade, whereby the propeller is adapted to engines of varied performance. The moderate pitch is maintained by a spring biased cam and follower means, and the maximum and minimum pitch requirements are adjustable. And, assembly is unique by the use of a thrust ball intermediate the opposed blade stems rotatable on radial-axial thrust bearings seated within a surrounding hub housing. Assembly of the separate blade stems is by means of a lever-nut secured rotatively to each blade stem by a removable pin. As will be described and as shown, durability and compactness is provided in a propeller hub with parts accessible.

SUMMARY OF INVENTION

This invention relates to propellers and fan blading and especially to controlled pitch aircraft propellers such as those used in light aircraft and powered sail planes. A feature herein is the employment of an extrusion as the basic cross sectional configuration of the propeller blade airfoil, and all of which is accomplished by the discriminate removal of material at the rear of the extruded blade to establish the variable camber configuration progressing from a low velocity airfoil toward the root of the blade and to a high velocity airfoil toward the tip of the blade. Conjointly with the said cross sectional variations, the blade is controllably twisted after machining and into its final and permanent formation by means of torsion applied discriminately at various radial stations therealong, and to the end that pitch is uniformly decreased toward the tip despite the tapering cross sectional configuration, all as hereinafter described.

The foregoing and other various objects and features of this invention will be apparent and fully understood from the following detailed description of the typical preferred form and applications thereof, throughout which description reference is made to the accompanying drawings.

DESCRIPTION OF THE DRAWINGS

FIG. 1 is a front view of the controllable pitch hub and blading assembly.

FIG. 2 is an enlarged front view of the blade removed from the assembly of FIG. 1.

FIGS. 3a through 3e inclusive are enlarged sectional views through the blade taken as indicated by lines 3a—3a through 3e—3e on FIG. 2 respectively.

FIG. 4 is an enlarged longitudinal sectional view of the hub and blade assembly taken as indicated by line 4—4 on FIG. 1.

FIG. 5 is a sectional view taken substantially as indicated by line 5—5 on FIG. 4.

FIGS. 5a, 5b and 5c illustrate the selective positioning of parts removed from FIG. 5, showing their high pitch, low pitch and full feathering positions respectively.

PREFERRED EMBODIMENT

Referring now to the drawings, the propeller blades B are mono-form members replaceably fastened to a revolving stem S carried by anti-friction bearings A disposed on radial axes respectively. The stems are thrust against said bearings by lever-nuts N that are keyed to the stems in each instance by a removable pin P, there being a thrust ball C that radially positions the said stems. The propeller shown is two bladed in which case the axes of bearings A are coaxially disposed through a hub housing H to intersect the rotational axis thereof and all of which is secured to the engine (not shown) drive flange 10 by screw fasteners 11. Coaxial with the rotational axis there is cylinder and piston means D within the housing H and responsive to controlling oil pressure introduced through a port 12 in shaft 10'. Means D connects to the lever-nuts N, the piston thereof being biased toward the feathered position by an adjustor means F that limits the extreme pitch positions and maintains a moderate pitch despite the reduction of oil pressure below a determined norm and to permit feathering upon the absence of oil pressure.

The propeller blade B is a wrought mono-form of aluminum alloy such as for example 2024 aluminum in the fully heat treated T4 condition, extruded into the basic cross sectional configuration shown in FIGS. 3a through 3e. As shown, the basic cross section is comprised of an eliptical leading edge 13 that fairs into a convex front camber 14 that constitutes approximately 80% of the chord and which tangentially continues into a flap 15 terminating in a thin trailing edge 16, and a convex back camber 17 that also constitutes approximately 80% of the chord and which concavely continues into said flap 15. The 20% extension of the flap 15 is slightly curvilinear and of uniform minimal thickness and extends angularly and substantially rearward of the back camber. Thus, the basic airfoil is lenticular and characterized by the angularly extending flap 15 that determines the nominal thickness of the trailing edge 16. The center of effort of the completed blade will extend along an axis approximately 40% rearward of the leading edge at the root of the blade and parallel therewith. Therefore, centered 40% rearward of the leading edge there is a mounting rib that constitutes approximately 50% of the chord and projects from the back camber to substantially double the blade thickness. Thus, in the basic extrusion the rub covers approximately half of the back camber, as shown at 21 in FIG. 2.

A two bladed propeller is shown with diametrically extending blades B configured and fabricated as hereinabove described. The hub housing H is provided to carry the blade B upon the bearings A, and to contain the cylinder and piston means D and lever means L which characterize this invention. The hub housing H is in the nature of a chest having a cylinder portion 35 secured coaxially to the engine flange 10 by the screw fasteners 11, and at least two blade journals 40 disposed on radial axes normal to the first mentioned cylinder portion; in the form disclosed herein, diametrically opposite coaxial blade journals. In practice, a centering boss of reduced diameter projects from the engine flange 10, there being a static seal 36 within a cylinder head 37 to hold the variable fluid pressure applied through port 12. The interior of the hub housing is essentially an open chamber for the accommodation of the cylinder and piston means D, and of the propeller stems S, lever means L, and adjustor means F hereinafter described.

The cylinder and piston means D involves a cylindrical portion of the hub housing, the wall thereof next adjacent to the engine flange having an inner diameter bore 38 of substantial extent, there being a piston 39 operable in said bore and sealed therewith as shown. The piston 39 reciprotates on the central axis of rotation and turns with the housing.

The opposite journals 40 are alike and a description of one will suffice for all, the said journals comprising a chest formation that extends forwardly from the cylindrical portion of the hub housing. Each journal provides a blade opening 41 to receive the stem S and carries a seal 42 engageable with the stem to retain fluids within said housing shaft, and it presents an inwardly faced seat 43 to receive a bearing A. The features of the journal 40 are coaxial, the axes of the two journals being diametrically coincidental as shown, or intersecting when three or more propeller blades B are involved.

The propeller blade stems S are alike, preferably identical, and provide a replaceable fitting to carry the replaceable propeller blades B. As shown, the stem S has a clevis 45 that embraces the boss 20 of the blade and secured thereto by shear fasteners 46 extending through the several matched openings therefor; and the stem has a trunnion 47 entering through the seal 42 and into the chest to carry the lever-nut N associated with the lever means L. Note that the trunnion 47 is free to both shift and turn on its radially disposed axis.

The anti-friction bearings A are alike, preferably identical, and provide a rotatable mounting for the propeller blade B in each instance. In practice, radial-axial thrust roller bearings are employed, with the inner race 50 slideably embracing the stem trunnion 47 and faced to oppose outward thrust, and with the outer race 51 positioned in the journal seat 43 and faced to oppose inward thrust. The lever-nut N is screw threaded onto the innermost end portion of the trunnion 47 and provides an outwardly faced thrust shoulder to positionably engage the inner bearing race 50: with shims 52 therebetween as circumstances require. A removable pin P engages through the lever-nut N and trunnion 47 to rotatively orient the same for the lever action next to be described. The bearing ball C is disposed between the opposed inner ends of the trunnions 47, seated in recesses therein respectively, so as to sustain inward thrust of the journaled blades B.

The lever means L is provided to simultaneously trim the plurality of propeller blades in response to reciprocation of the piston 39, and comprises a link 56 extending from the said piston to each lever-nut N rotatively positioning the blade B. In the preferred form, a clevis 57 extends above the top of piston 39 to carry divergent links 56 on a common pivot 58. Each link 56 is selectively coupled by a separate pivot 59 to the lever-nut N to be actuated thereby, and all of which is ascessible through the open front of the chest portion of the hub housing H. As best illustrated in FIGS. 5a–c of the drawings, the lever-nut N is of plate configuration with angularly spaced openings 59' for selective performance of the blading dependent upon the performance, for example, of the aircraft or other adaptations to which it is to be applied. Accordingly, high speed, mid speed and low speed blading positions are determined by the angularly spaced openings 59' embracing the mid range of pitch as shown, and extreme positioning is provided as shown in FIG. 5c to provide full feathering for mid speed blading performance. As shown, the lever portion of nut N operates through an arc of approximately 30 degrees to turn the propeller blade B between the selected low pitch and high pitch conditions.

A cover 60 closes the interior of the hub housing H and provides spring seats and rod guides 61 of the adjustor means F accessible at the exterior of the assembly for adjustment. The adjustor means F controls the lever means L responsive to the cylinder and piston means D, for trimming the blades B through the linkage to the lever-nuts N. As shown, a pair of diametrically opposite control rods 62 project in parallel relation from the piston 39 and slideably extend through the cover seat guides 61 to project forwardly therefrom. Compression springs 63 surround the rods 62, seating against the cover spring seats to yieldingly depress the piston 39 rearwardly and calibrated to control forward movement commensurate with the engine oil pressure applied to the cylinder bore 38.

Feathering and pitch limitation is provided for in a transverse header 64 fixed between the forward extremities of the rods 62 to move therewith over a stem 65 fixedly projecting therethrough from the cover 60. The stem 65 is concentric with the propeller axis and threadedly carries adjustably positionable stops 66 and 67 to restrict both forward and rearward movement of the header, thereby limiting blade rotation through the mechanism hereinabove described. Further, there is a restriction against feathering during low speed engine operation, despite the lower engine oil pressure available to the cylinder and piston means D. This restriction is effected by a cam and follower means 70, comprised of opposed spring biased balls 71 engageable with an inclined plane or cone 72 on the stem 65, positioned to hold a normal propeller pitch (see FIG. 5) until the engine is stopped and oil pressure ceases and under which condition the pressure of springs 63 cause the spring biased balls 71 to override the cone 72.

From the foregoing it will be seen that a commercially practical blade and propeller hub assembly is provided, especially for light aircraft and comparable fan installations. The blades per se are fabricated from readily available material adapted to extrusion and subject to easily performed machine and forming operations, while the hub assembly for feathering-to-pitch control is compact and the parts accessible for maintenance and repair. The propeller pitch is positively applied through the lever and spring movement responsive to engine speed and to the uniform oil pressure available at normal operational speeds. A pre-determined moderate pitch remains at lower operational speeds, and full feathering follows in response to stopping the engine with a consequent lack of oil pressure. The overbalance of the trailing portion of the blade airfoil assures the application of pitch in response to rotation, to be followed in time by the build-up of engine oil pressure which maintains pitch according to the bias of the springs 63, and as restricted by the stop 66, while the optimum full feathered position is established by the stop 67.

Having described only a typical preferred form and applications of my invention, I do not wish to be limited or restricted to the specific details herein set forth, but wish to reserve to myself any modifications or variations that may appear to those skilled in the art:

I claim:

1. A feathering pitch control propeller hub for coupled engagement with an axial drive flange with a port supplying fluid under operating pressure, and including; an integral hub housing securable to the drive flange and having a static seal communicating fluid from the port and into a cylinder on the axis of rotation and forward of the drive flange, a piston sealed with and operable axially within the cylinder, at least two radially disposed blade journals opening from a chest portion of the hub housing forward of the cylinder and piston, propeller blade stems entering said chest portion through bearings thrust radially outwardly against seats in the journal openings respectively, a dimensionally stable center bearing member disposed between opposed inner ends of the propeller blade stems, a lever-nut affixed to the inner end of each stem and positioned to thrust outwardly against the bearings, a link extending rearwardly from each nut and connected to the piston for pitch control, a shim disposed between at least one of said lever-nuts and a bearing to maintain a pre-load against said bearings, and spring means biasing the piston rearwardly against said fluid in the cylinder to rotate the stems toward a blade feathering position, said fluid under operating pressure actuating the piston to rotate the stems toward a blade pitch position.

2. The feathering and pitch control propeller hub as set forth in claim 1, wherein the propeller blade stems are on a common diametrical axis with the center bearing therebetween.

3. The feathering and pitch control propeller hub as set forth in claim 1, wherein each lever-nut is threaded onto its propeller blade stem and rotatably positioned thereon by a removable pin.

4. The feathering and pitch control propeller hub as set forth in claim 1, wherein the shim disposed between at least one of said lever-nuts and a bearing adjusts the preload against the bearings.

5. The feathering and pitch control propeller hub as set forth in claim 1, wherein the shim disposed between at least one of said lever-nuts and a bearing adjusts the preload against the bearings, and wherein each lever-nut is threaded onto its propeller blade stem and rotatably postioned thereon by a removalbe pin.

6. The feathering pitch control propeller hub as set forth in claim 1, wherein the propeller blade stems are on a common diametrical axis with the center bearing member therebetween, wherein the shim disposed between at least one of said lever-nuts and a bearing adjusts the pre-load against the bearings, and wherein each lever-nut is threaded onto its propeller blade stem and rotatably postioned thereon by a removable pin.

7. A feathering and pitch control propeller hub for coupled engagement with an axial drive flange with a port supplying fluid under operating pressure, and including; an integral hub housing securable to the drive flange and having a static seal communicating fluid from the port and into a cylinder on the axis of rotation and forward of the drive flange, a piston sealed with and operable axially within the cylinder, at least two radially disposed blade journals opening from a chest portion of the hub housing forward of the cylinder and piston, propeller blade stems entering said chest portion through bearings thrust radially outwardly against seats in the journal openings respectively, a dimensionally stable center bearing member disposed between opposed inner ends of the propeller blade stems, a lever-nut affixed to the inner end of each stem and positioned to thrust outwardly against the bearings, a link extending forwardly from each nut and connected to the piston for pitch control, a shim disposed between at least one of said lever-nuts and a bearing to maintain a pre-load against said bearings, adjuster means for limiting movement of the piston and links and stems rotated thereby and comprising a control rod projecting axially from the piston and forward of the propeller blade stems and to a positionable stop at the exterior of and engageable with a member on the hub housing, and spring means biasing the piston rearwardly against said fluid in the cylinder to rotate the stems toward a blade feathering position, said fluid under pressure actuarating the piston to rotate the stems toward a blade pitch position.

8. The feathering and pitch control propeller hub as set forth in claim 7, wherein the control rod of the adjustor means projects forwardly through a cover closing the hub housing chest and carrying said member engageable with said positionable stop.

9. The feathering and pitch control propeller hub as set forth in claim 7, wherein a pair of control rods of the adjustor means project forwardly through a cover closing the hub housing chest and said rods carrying a header engageable with said positionable stop on said member carried by the cover.

10. The feathering and pitch control propeller hub as set forth in claim 7, wherein a pair of control rods of the adjustor means project forwardly through a cover closing the hub housing chest and said rods carrying a header engageable over a stem projecting from the cover and with said stop positionable thereon to engage said header.

11. The feathering and pitch control propeller hub as set forth in claim 7, wherein a pair of control rods of the adjustor means project forwardly through a cover closing the hub housing chest and said rods carrying a header engageable over a stem projecting from the cover and with spaced stops positionable thereon to engage opposite sides of said header.

12. The feathering and pitch control propeller hub as set forth in claim 7, wherein a pair of control rods of the adjustor means projects forwardly through a cover closing the hub housing chest and said rods carrying a header engageable over a stem projecting from the cover and with said stop positionable thereon of engage said header, and a cam face on said stem and a spring biased follower in said header engageable with said cam face to releasably space the stop from said header and thereby restricting the blade feathering position thereof.

13. The feathering and pitch control propeller hub as set forth in claim 7, wherein a pair of control rods of the adjuster means project forwardly through a cover closing the hub housing chest and said rods carrying a header engageable over a stem projecting from the cover and with spaced stops positionable thereon to engage opposite sides of said header, and a cam face on said stem and a spring biased follower in said header engageable with said cam face to releasably space the stops from said opposite sides of said header and thereby restricting the blade featherin position thereof.

* * * * *